US011175098B2

(12) United States Patent
Quinzanini et al.

(10) Patent No.: US 11,175,098 B2
(45) Date of Patent: Nov. 16, 2021

(54) WALL-MOUNTED RADIANT COOLING DEVICE

(71) Applicant: EQUOCLIMA SRL, Gabbioneta Binanuova (IT)

(72) Inventors: Roberto Quinzanini, Cigole (IT); Massimo Gavizzoli, Brescia (IT)

(73) Assignee: EQUOCLIMA S.R.L., Gabbioneta Binanuova (IT)

(*) Notice: Subject to any disclaimer, the term of this patent is extended or adjusted under 35 U.S.C. 154(b) by 200 days.

(21) Appl. No.: 16/486,864

(22) PCT Filed: Mar. 7, 2018

(86) PCT No.: PCT/IT2018/050036
§ 371 (c)(1),
(2) Date: Aug. 19, 2019

(87) PCT Pub. No.: WO2018/163225
PCT Pub. Date: Sep. 13, 2018

(65) Prior Publication Data
US 2020/0232713 A1    Jul. 23, 2020

(30) Foreign Application Priority Data
Mar. 8, 2017  (IT) .......................... 102017000025518

(51) Int. Cl.
*F24F 5/00*    (2006.01)
*F24F 13/22*   (2006.01)
(Continued)

(52) U.S. Cl.
CPC .............. *F28D 1/04* (2013.01); *F24F 5/0089* (2013.01); *F24F 13/222* (2013.01); *F28F 1/16* (2013.01);
(Continued)

(58) Field of Classification Search
CPC combination set(s) only.
See application file for complete search history.

(56) References Cited

U.S. PATENT DOCUMENTS

| 5,363,908 A | * | 11/1994 | Koster | ..................... F24D 3/165 |
|---|---|---|---|---|
| | | | | 165/49 |
| 5,495,724 A | * | 3/1996 | Koster | ..................... F24F 13/22 |
| | | | | 62/259.1 |

(Continued)

FOREIGN PATENT DOCUMENTS

| DE | 724762 C | 9/1942 |
|---|---|---|
| DE | 1070656 B | 12/1959 |

(Continued)

OTHER PUBLICATIONS

International Search Report, dated Jun. 11, 2018, from corresponding PCT application No. PCT/IT2018/050036.

(Continued)

*Primary Examiner* — Devon Russell
(74) *Attorney, Agent, or Firm* — Nixon & Vanderhye

(57) ABSTRACT

In the field of building and of cooling systems there is disclosed a wall-mounted radiant cooling device for rooms, including: at least two cooling tubes positioned on two different levels adapted for cooled water to flow through; a fixing unit of the cooling tubes to the outside of the walls of the rooms. Each cooling tube includes two shaped longitudinal fins, and the radiant cooling device further includes a channel, arranged parallel to and underneath the cooling tubes, adapted to collect the condensate that is generated through contact with the hot air present in the rooms provided with the cooling tubes. The longitudinal fins of the cooling tubes are adapted to cooperate with one another to convey the condensate into the channel.

6 Claims, 3 Drawing Sheets

(51) Int. Cl.
*F28D 1/04* (2006.01)
*F28F 1/16* (2006.01)
*F28F 17/00* (2006.01)
*F28D 21/00* (2006.01)

(52) U.S. Cl.
CPC ........ *F28F 17/005* (2013.01); *F24F 2221/17* (2013.01); *F24F 2221/54* (2013.01); *F28D 2021/0019* (2013.01)

(56) References Cited

U.S. PATENT DOCUMENTS

| | | | | |
|---|---|---|---|---|
| 5,966,959 | A * | 10/1999 | Stewart | F24F 13/222 62/285 |
| 6,196,015 | B1 * | 3/2001 | Pignolo | F24F 1/0003 62/285 |
| 6,321,554 | B1 * | 11/2001 | Rigoni | F24F 1/0003 62/259.1 |
| 2010/0107675 | A1 * | 5/2010 | Lifson | F28F 1/32 62/285 |
| 2015/0292790 | A1 * | 10/2015 | Mastroianni | F28D 1/0476 62/285 |
| 2015/0338108 | A1 * | 11/2015 | Murakami | F24D 3/16 165/49 |
| 2017/0167749 | A1 * | 6/2017 | Murakami | F28F 1/20 |
| 2018/0003418 | A1 * | 1/2018 | Hu | F24F 5/0089 |

FOREIGN PATENT DOCUMENTS

| | | | |
|---|---|---|---|
| DE | 9304461 | U1 | 5/1993 |
| DE | 202011003135 | U1 | 6/2011 |
| EP | 1739365 | A1 * | 1/2007 ............ F28F 1/126 |
| EP | 1739365 | A1 | 1/2007 |
| EP | 3009749 | A1 | 4/2016 |
| WO | 2017009951 | A1 | 3/2018 |

OTHER PUBLICATIONS

Written Opinion, dated Jun. 11, 2018, from corresponding PCT application No. PCT/IT2018/050036.

* cited by examiner

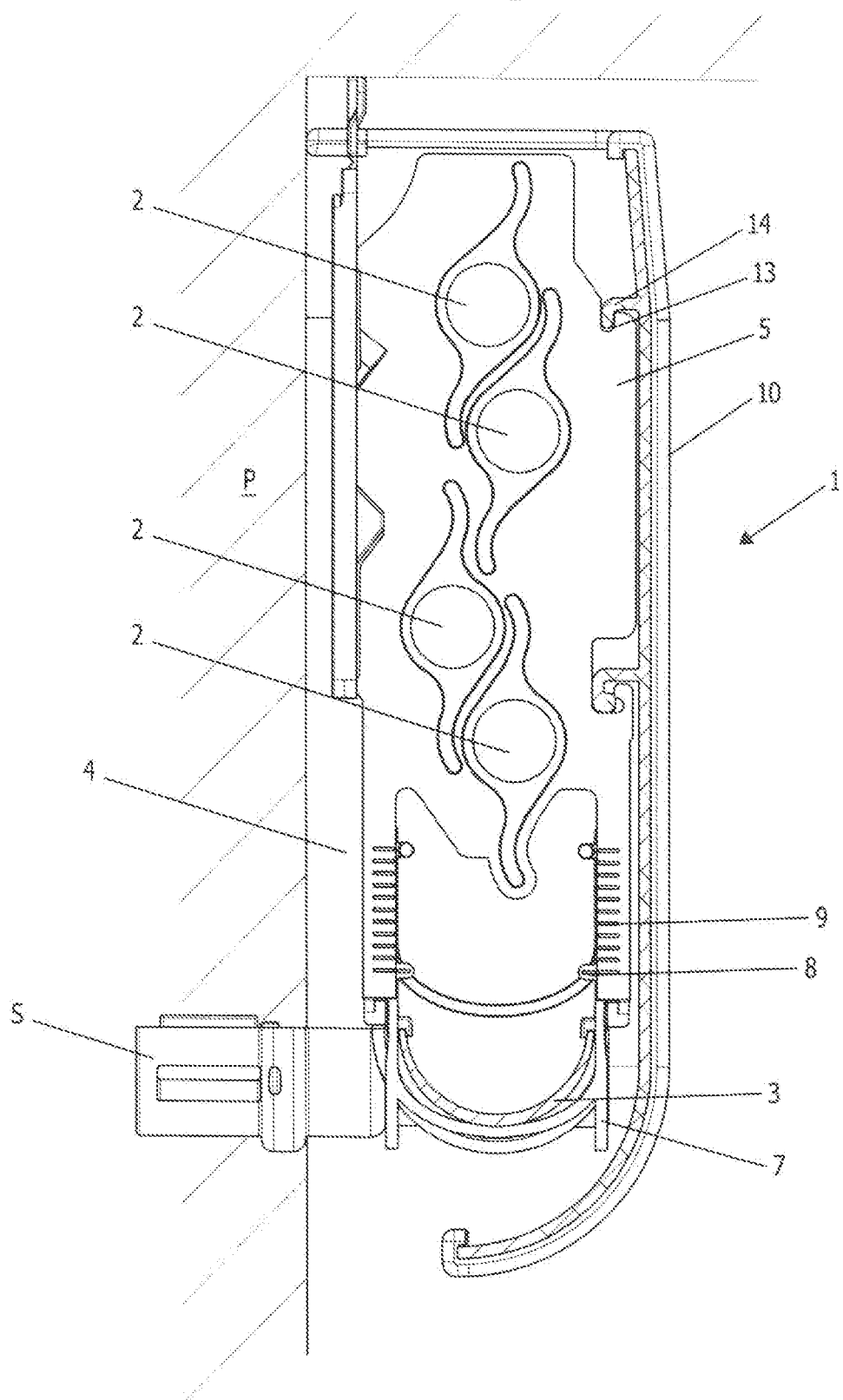

WALL-MOUNTED RADIANT COOLING DEVICE

BACKGROUND OF THE INVENTION

Field of the Invention

The present invention concerns the field of building and of cooling systems and, more in detail, the invention relates to a wall-mounted radiant cooling device.

Radiant systems have developed rapidly due to their ability to heat rooms guaranteeing high levels of personal comfort. There is an increasing market demand for the same system, in particular a wall- and ceiling-mounted system, to be able to function also in summer with a cooling function.

Description of the Related Art

In current radiant cooling systems, metal pipes, through which a coolant such as water at a temperature of around 15-18° C. flows, are arranged in the wall or the ceiling, in particular in plasterboard ceilings.

The coolant that flows through the pipe cools the wall by conduction, which in turn cools the air that touches it by convection and the whole room by radiation.

The hot air in contact with the cold walls is cooled contributing to lowering the temperature of the room.

The advantages are numerous:

improved comfort, as radiant exchange with a cold surface not too different from the temperature of the room provides the person with a feeling of well-being;

compared to an air conditioning system, conditions of discomfort caused by movement of masses of cold air are limited and the noise caused by motorized fans is reduced.

However, conventional radiant cooling systems also have some problems and complications related to operation.

Firstly, the systems described above must be installed during construction of the building. Therefore, they cannot be rapidly and easily arranged in existing rooms, without carrying out substantial building works.

If a room is to be optimally heated and cooled using a radiant system, an air dehumidification system must be installed.

The humidity inside dwellings during summer can be substantial, both due to unfavourable outdoor conditions and to the presence of people, who through their activities also contribute to increasing water vapor. In this situation condensate can form on the cold surface, a condition to be avoided in order to prevent damage to structures.

Moreover, for personal comfort, according to the recommendations of manuals and regulations, the relative humidity should not exceed 60-65% to guarantee a feeling of comfort and keep the air in the rooms healthy.

Therefore, the systems must be provided with a special machine, called isothermal dehumidifier, capable of lowering the relative humidity of the air taken from the room, with additional costs for installation, energy and maintenance, as well as additional space for its installation.

Dehumidifiers can also be provided with forced air circulation, which makes the machine noisy and can be bothersome for users.

BRIEF SUMMARY OF THE INVENTION

Document EP 1 739 365 A1 discloses a wall-mounted radiant cooling device for rooms, comprising:

two cooling tubes positioned on two different levels adapted for cooled water to flow through;

fixing means of said cooling tubes to the outside of the walls of said rooms; and a channel, arranged parallel to and underneath said cooling tubes, adapted to collect the condensate that is generated through contact with the hot air present in said rooms provided with said 5 cooling tubes.

The object of the invention is to produce a wall-mounted radiant cooling device that is efficient, easily and rapidly assembled and installed, silent, easy to clean and accessible for maintenance operations.

These objects are achieved by a wall-mounted radiant cooling device for rooms, comprising:

at least two cooling tubes positioned on two different levels adapted for cooled water to flow through;

fixing means of said cooling tubes to the outside of the walls of said rooms; and a channel, arranged parallel to and underneath said cooling tubes, adapted to collect the condensate that is generated through contact with the hot air present in said rooms provided with said cooling tubes, characterized in that:

each cooling tube comprises two shaped longitudinal fins;

wherein said longitudinal fins of said cooling tubes are adapted to cooperate with one another to convey said condensate into said channel.

Advantageously, said two longitudinal fins are continuous and protrude in a diametrically opposite manner from said cooling tubes.

In a particularly preferred variant, said cooling tubes are four, arranged staggered from one another on several levels, each cooling tube being oriented so that the condensate drains in a cascade by means of said longitudinal fins from the upper level to the lower level and then into said channel.

According to a first aspect of the invention, said wall fixing means of said cooling tubes comprise a plurality of plates for fixing to the wall and a plurality of brackets transverse with respect to said cooling tubes, where said plates and said brackets cooperate by interlocking through shape coupling.

In particular, said brackets comprise shaped openings adapted to house said cooling tubes to support them at different levels and space them from one another.

Moreover, said brackets comprise supporting means of said channel.

According to a possible variant of embodiment, said supporting means of said channel comprise elastically deformable U-shaped profiles, adapted to be hung on the lower portion of said brackets, and said supporting means comprise means for adjusting the height of said channel, so as to be able to give said channel a predetermined slope and facilitate disposal of the condensate collected.

In particular, said means for adjusting the height of said channel comprise:

at least a pair of tabs projecting from said U-shaped profiles, a plurality of corresponding pairs of grooves obtained on said brackets, adapted to selectively retain said tabs.

According to a further aspect of the invention, said device comprises a front casing for covering said cooling tubes.

The advantages of the invention are many and evident. The cooling tubes outside the walls prevent the risk of molds forming on the walls and do not require the installation of specific dehumidifier or forced air circulation machines.

The hot air that occupies the upper portion of the rooms transfers heat to said cooling tubes by touching their surface.

The temperature of the air decreases and its density increases: the cooler air descends along the walls, cooling them.

Consequently, heat exchange takes place without forced air movement, almost completely eliminating the movements of particulate present in the air and bothersome noise.

The size and the shape of the longitudinal fins provided on the tubes causes collection, channelling and drainage of the condensate that is produced when the hot air of the room touches the cooling tubes. This condensate is advantageously conveyed into the specific channel under the cooling tubes, preventing dripping along the walls and the appearance of unsightly mold stains.

The longitudinal fins are made of the same material as the cooling tubes from which they protrude in a single block: the continuity of the conductor material considerably increases the performance of the radiant cooling device, above all in terms of efficiency and increased output.

Four cooling tubes define the best layout in terms of footprint/cooling power ratio: the geometry of the fins, with the opposed double curve allows the tubes to be placed side by side but staggered, and arranged at different heights, creating the ideal path for dripping of the condensate.

The tubes oriented so that the respective fins converge on one another in cascade allows a further reduction of the footprint of the condensate collection channel below, with further advantages in terms of space occupied and visual impact.

The condensate collection channel can advantageously be positioned with a certain slope, necessary to facilitate disposal of the liquids collected.

The supporting means of the collection channel are in fact provided with means for adjusting their height. Advantageously, said adjusting means cooperate through shape coupling means.

The means for fixing the whole device to the wall are easy to install and, due to the possible shape coupling between the various components, interlocking between the cooling tubes, the brackets and the plates takes place rapidly and without the need to use numerous screws, screw anchors or other hardware, speeding up assembly and making the whole device much more economical.

The device is also easily disassembled for cleaning and maintenance operations.

Even more advantageously, the device is fitted to existing walls with rapid installation and without requiring building works, as it projects completely from the walls.

BRIEF DESCRIPTION OF THE DRAWINGS

These and other advantages will be more apparent below in the description of a preferred embodiment of the invention, provided by way of non-limiting example, and with the aid of the figures, where:

FIG. 2 illustrates, in a cross section along a vertical plane, the radiant cooling device of FIG. 1;

DETAILED DESCRIPTION OF THE PREFERRED EMBODIMENTS

Figure 1:
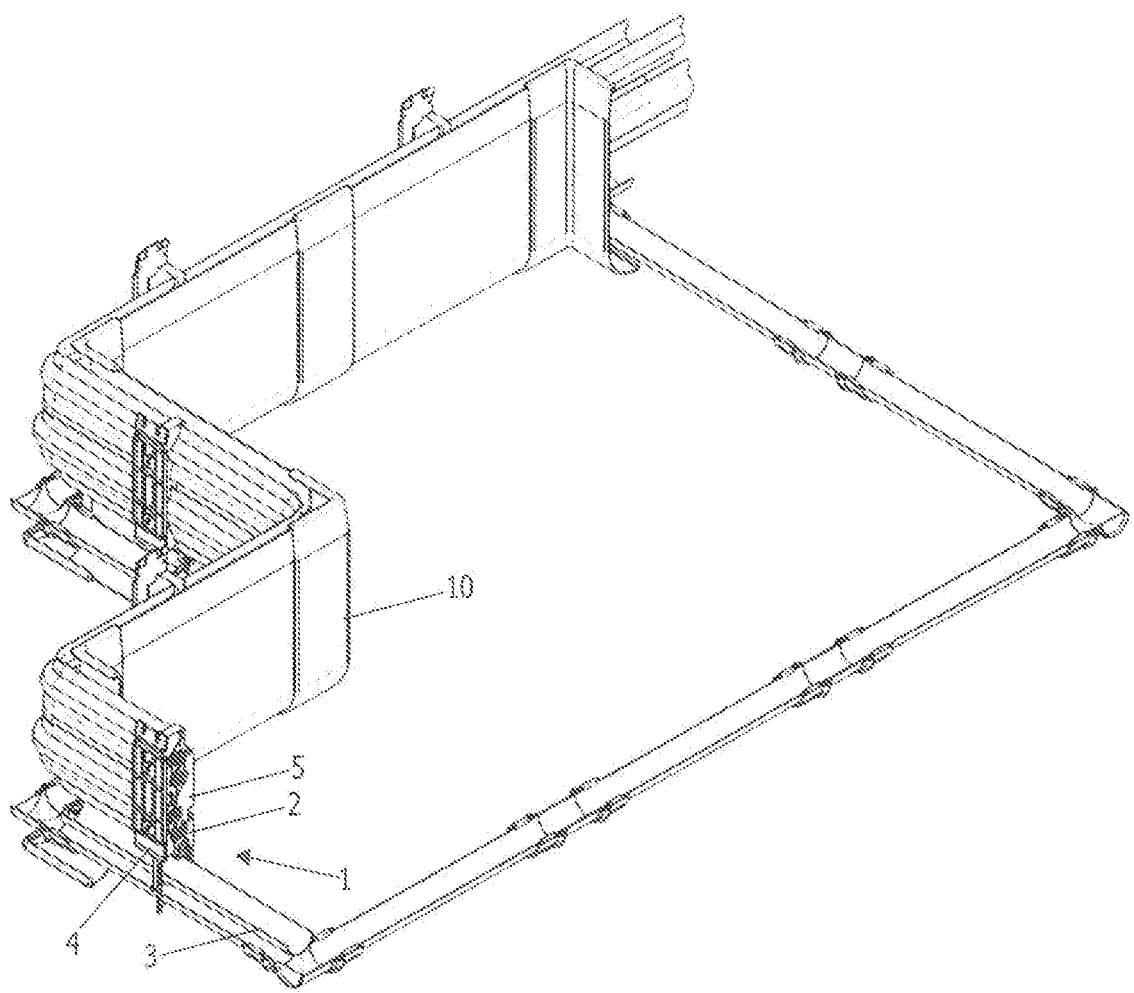
FIG. 1 illustrates, in a partially exploded axonometric section, a wall-mounted radiant cooling device produced according to the invention.

With reference to FIGS. 1 and 2, there is illustrated a radiant cooling device 1, adapted to be fixed to walls P of rooms close to the ceiling.

Said wall-mounted radiant cooling device 1 essentially comprises:

cooling tubes 2 made of metal material, advantageously four in number, adapted for cooled water to pass through at a temperature variable between 5° and 16° C.;

fixing means 4, 5 of said cooling tubes 2 to the wall P, so that said tubes 2 are substantially parallel to one another and projecting;

a channel 3 arranged parallel to and underneath said tubes 2 and with a slight slope, adapted to collect the condensate that is generated through contact of the hot air with said cooling tubes;

a front casing 10 for covering said cooling tubes 2.

For an optimal cooling system 1, said fixing means are provided in the upper portion of the walls P and close to the ceiling of the rooms. It is clear that in very large rooms, with high ceilings, it is sufficient for the portion of cooled wall to be the portion substantially "at head height": in this case the fixing means will be suitably positioned, for example at a maximum height of 3.2 meters.

Two cooling tubes 2 are sufficient to produce a wall-mounted radiant cooling device 1 according to the invention, but four tubes 2 ensure maximum performance with the minimum thickness and footprint.

Said cooling tubes 2 are made of aluminum, have a maximum length of 6 m and, where necessary, can be joined to one another with quick fittings of known type.

Figure 3:
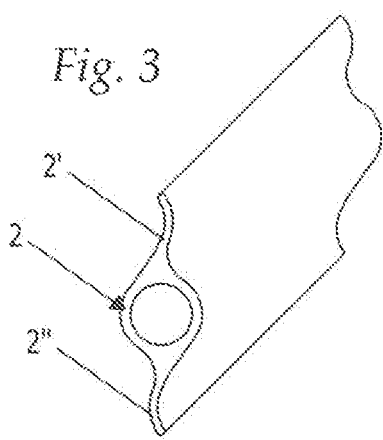
FIGS. 3 and 4 illustrate, respectively in an axonometric view and in a section along a vertical plane, a component of the device according to the invention.
Figure 4:
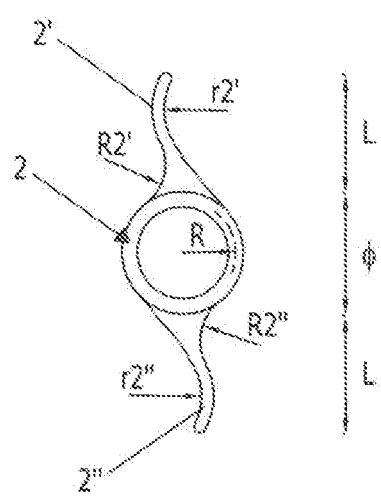
Figure 5:
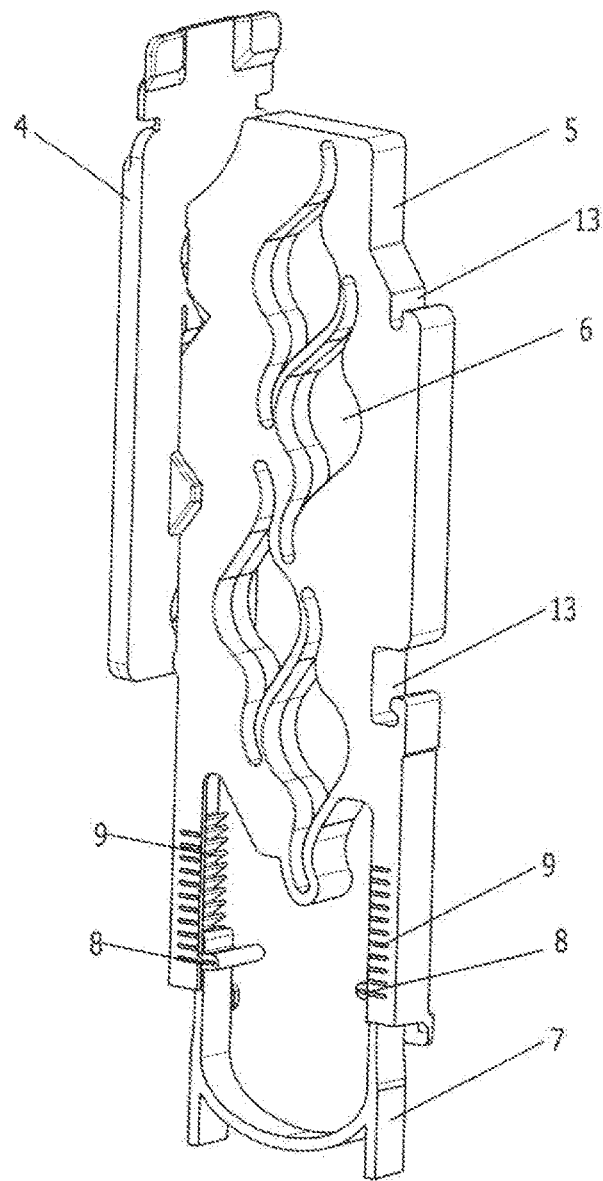
FIG. 5 illustrates, in an axonometric view, the device of FIG. 2, partially exploded.
Figure 6:
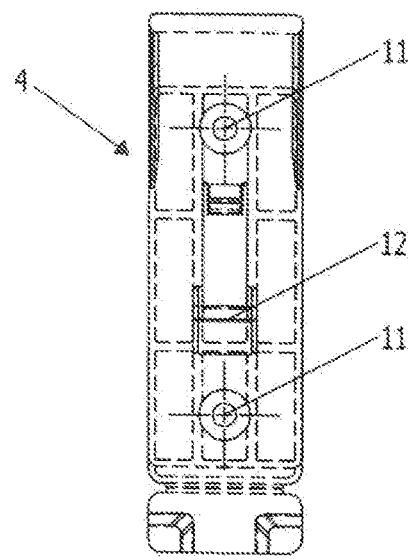
FIGS. 6 and 7 illustrate, respectively in a plan view and in an axonometric view, a further component of the device according to the invention.
Figure 7:
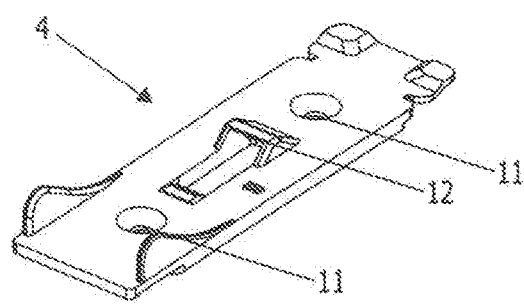

With particular reference to FIGS. 3 and 4, a cooling tube 2 provided with an original geometry is represented.

Said cooling tube 2 comprises two continuous shaped longitudinal fins 2', 2" that protrude radially therefrom on diametrically opposite sides.

Said longitudinal fins 2', 2" substantially belong to a same plane that ideally cuts the radiant tube symmetrically.

The radial extension L of said longitudinal fins 2', 2" is equal to approximately the average diameter Φ of the corresponding tube from which they protrude.

However, said fins 2', 2", in section, are not flat, but slightly curved. In particular, said longitudinal fins are each provided with an opposed double curvature, and said opposed double curvatures have a radius r2', R2', r2", R2" equal to approximately the average radius R of the corresponding cooling tube from which they protrude.

Said longitudinal fins 2', 2" of each cooling tube 2 are adapted to cooperate with the respective longitudinal fins 2', 2" of adjacent tubes 2 positioned on another level to create an obligatory passage for the condensate that is generated on the walls of these tubes and convey said condensate toward the specific collection channel 3.

With particular reference to FIGS. 4-7, the means for fixing said cooling tubes 2 and said collection channel 3 to the wall P are illustrated.

Said fixing means can be attached to the wall P along the cooling tubes 2, at a distance of approximately one meter from one another.

In particular, said fixing means comprise a plurality of brackets 5 transverse to said cooling tubes 2, and a plurality of plates 4 for fixing to the wall P.

Said brackets 5 comprise shaped openings 6, adapted to house said cooling tubes 2 to support them and space them from one another.

Said brackets 5 comprise supporting means of said channel 3.

Said supporting means are produced by means of elastically deformable U-shaped profiles 7, so as to be attached to said brackets 5 and substantially remain hung on the lower part thereof.

Said channel 3 rests on said U-shaped profiles 7.

Said supporting means comprise means for adjusting their height: by varying the height of said supporting means, the height of said channel 3 is automatically varied. By modifying this height at each bracket 5 it is possible to give said channel 3 a predetermined slope and facilitate disposal of the condensate collected therein toward a previously installed drainage point S.

Said adjustment means are of the type with shape coupling and comprise a pair of tabs 8 obtained on said U-shaped profiles 7 adapted to be retained in specific pairs of selectable grooves 9 obtained on said bracket 5 at different heights.

Said grooves 9 are preferably spaced at 2 mm from one another.

Considering that the means for fixing the tubes 2 to the wall are arranged one every meter, it is clear that the condensate collection channel 3 can have a maximum slope of 2%.

Said plates 4 comprise holes 11 adapted to house the screws for fixing to the wall.

Said screws are the only hardware used for installation of the cooling device 1 according to the invention, while all the other components cooperate with one another with quick fitting and coupling means.

Said brackets 5 and said plates 4 cooperate with one another with an interlocking system through shape coupling: each plate 4 comprises a projecting tab 12, shaped to be inserted inside a respective slot obtained on a corresponding bracket.

Each bracket 5 also comprises two further slots 13, adapted this time to stably house respective tabs 14 provided on the inner surface of the front casing 10.

Said casing 10 can have a coloured outer finish, or can be personalized with the reproduction, on the surface thereof, of any decorative effect, to best adapt to the furnishings and to the context in which it is installed.

It is fundamental that said casing 10 is not resting completely against the wall P in the lower portion of the device 1 so as to leave a longitudinal opening for passage of the cooling air that will touch the wall P below.

In an alternative variant, said cooling device 1 could be recessed in a false ceiling to conceal it and improve the appearance of the room.

Operation of the wall-mounted radiant cooling device 1 for rooms according to the invention is described below.

A coolant, such as water at a temperature comprised between 5° and 16° C., is input into the cooling tubes 2.

The hot air that normally tends to occupy the upper part of the rooms transfers heat to said cooling tubes by touching them.

This transfer of heat decreases the temperature of the air that by becoming heavier causes a descending motion along the walls, in turn cooling them.

Exploiting the mass of the cooled walls, the whole of the surrounding room will consequently be cooled homogeneously through radiation.

At the same time, the tubes 2 subject to a variation of temperature will act as condensation battery: the condensate that forms on their surface will be conveyed in succession from the longitudinal fins 2', 2" directly in cascade into the specific collection channel 3 housed in the lower portion of the device 1.

The invention claimed is:

1. A wall-mounted radiant cooling device (1), comprising:
at least two cooling tubes (2) positioned on two different levels, said at least two cooling tubes (2) adapted for cooled water to flow through,
each of said at least two cooling tubes (2) comprising a first fin (2') and a second fin (2"), each of said first and second fins (2', 2") being curved in a radial direction away from each of said at least two cooling tubes (2),
wherein the second fin (2") of a first of the at least two cooling tubes (2) is located spaced apart from the first fin (2') of a second of the at least two cooling tubes (2), and a condensate passage is formed by the second fin (2") of a first of the at least two cooling tubes (2) being located spaced apart from the first fin (2') of a second of the at least two cooling tubes (2);
a fixing element (4, 5),
wherein each of said at least two cooling tubes (2) are fixed to an outside of a wall (P) of a room by said fixing element; and a channel (3), arranged parallel to and underneath said at least two cooling tubes (2), said channel adapted to collect condensate that is generated through hot air present in said room contacting the at least two cooling tubes (2), wherein,
said condensate passage is positioned over said channel (3) to convey the condensate into said channel (3),
wherein said fixing element comprises a plurality of plates (4) for fixing to the wall (P) and a plurality of brackets (5) transverse with respect to said at least two cooling tubes (2), where said plates (4) and said brackets (5) cooperate by interlocking through shape coupling,
wherein said brackets (5) comprise channel supports (7),
wherein said channel supports (7) comprise elastically deformable U-shaped profiles (7), the elastically deformable U-shaped profiles (7) adapted to be hung on a lower portion of said brackets (5),
wherein said wherein said channel supports (7) comprise means for adjusting a height of said channel (3) including:
at least a pair of tabs (8) projecting from said U-shaped profiles (7), and
a plurality of corresponding pairs of grooves (9) obtained on said brackets (5), adapted to selectively retain said tabs (8).

2. The wall-mounted radiant cooling device (1) according to claim 1, wherein the first fin (2') and the second fin (2") of said at least two cooling tubes (2) are continuous and respectively extend longitudinally along each of said at least two cooling tubes (2) and protrude in the radial direction away from diametrically opposite sides of said at least two cooling tubes (2).

3. The wall-mounted radiant cooling device (1) according to claim 1, wherein said at least two cooling tubes comprise four cooling tubes, arranged staggered from one another on several levels, each of said four cooling tubes (2) being oriented so that the condensate drains in a cascade between said first and second fins from an upper level to a lower level and then into said channel (3).

4. The wall-mounted radiant cooling device (1) according to claim 1, wherein said brackets (5) comprise shaped openings (6) adapted to house said at least two cooling tubes (2) to support said at least two cooling tubes (2) at different levels and space said at least two cooling tubes (2) from one another.

5. The wall-mounted radiant cooling device (1) according to claim 1, further comprising a front casing (10) for covering said cooling tubes (2).

6. A wall-mounted radiant cooling device (1), comprising:
at least two cooling tubes (2) positioned on two different levels, said at least two cooling tubes (2) adapted for cooled water to flow through,
each of said at least two cooling tubes (2) comprising a first fin (2') and a second fin (2"), each of said first and second fins (2', 2") being curved in a radial direction away from each of said at least two cooling tubes (2),
wherein the second fin (2") of a first of the at least two cooling tubes (2) is located spaced apart from the first fin (2') of a second of the at least two cooling tubes (2), and a condensate passage is formed by the second fin (2") of a first of the at least two cooling tubes (2) being located spaced apart from the first fin (2') of a second of the at least two cooling tubes (2);
a fixing element (4, 5),
wherein each of said at least two cooling tubes (2) are fixed to an outside of a wall (P) of a room by said fixing element; and
a channel (3), arranged parallel to and underneath said at least two cooling tubes (2), said channel adapted to collect condensate that is generated through hot air present in said room contacting the at least two cooling tubes (2), wherein,
said channel supports (7) comprise elastically deformable U-shaped profiles (7),
said condensate passage is positioned over said channel (3) to convey the condensate into said channel (3),
wherein said fixing element comprises a plurality of plates (4) for fixing to the wall (P) and a plurality of brackets (5) transverse with respect to said at least two cooling tubes (2), where said plates (4) and said brackets (5) cooperate by interlocking through shape coupling,
wherein said brackets (5) comprise channel supports (7),
wherein said channel supports (7) comprise means for adjusting a height of said channel (3), so as to be able to give said channel (3) a predetermined slope and facilitate disposal of the condensate collected,
wherein said means for adjusting the height of said channel (3) comprise:
at least a pair of tabs (8) projecting from said U-shaped profiles (7), and
a plurality of corresponding pairs of grooves (9) obtained on said brackets (5), adapted to selectively retain said tabs (8).

\* \* \* \* \*